United States Patent
Carney et al.

(10) Patent No.: US 7,595,907 B2
(45) Date of Patent: Sep. 29, 2009

(54) METHOD AND APPARATUS FOR PROVIDING PRINTER RECOGNITION AND MANAGEMENT OF A PRINT JOB ENTITY

(75) Inventors: Dennis Michael Carney, Louisville, CO (US); Charles David Johnson, Boulder, CO (US); Russel Neil Miller, Longmont, CO (US); Larry David Teklits, Loveland, CO (US); Steven Michael Wallace, Tucson, AZ (US)

(73) Assignee: Infoprint Solutions Company, LLC, Boulder, CO (US)

( * ) Notice: Subject to any disclaimer, the term of this patent is extended or adjusted under 35 U.S.C. 154(b) by 141 days.

(21) Appl. No.: 11/879,892

(22) Filed: Aug. 29, 2006

(65) Prior Publication Data

US 2008/0186529 A1 Aug. 7, 2008

Related U.S. Application Data

(63) Continuation of application No. 09/753,470, filed on Jan. 3, 2001.

(51) Int. Cl.
*G06F 15/00* (2006.01)
*G06F 3/00* (2006.01)

(52) U.S. Cl. ............... 358/1.15; 358/1.14; 358/403; 710/19; 719/329; 709/218; 709/219

(58) Field of Classification Search ............ 358/1.15, 358/1.14, 403; 710/19; 719/329; 709/218, 709/219
See application file for complete search history.

(56) References Cited

U.S. PATENT DOCUMENTS

| | | | |
|---|---|---|---|
| 5,402,527 A | 3/1995 | Bigby et al. | |
| 5,701,411 A | 12/1997 | Tran et al. | |
| 5,791,790 A | 8/1998 | Bender et al. | |
| 5,873,659 A | 2/1999 | Edwards et al. | |
| 5,935,262 A | 8/1999 | Barrett et al. | |
| 5,970,224 A | 10/1999 | Salgado et al. | |
| 5,982,994 A | 11/1999 | Mori et al. | |
| 5,995,721 A | 11/1999 | Rourke et al. | |
| 6,025,925 A | 2/2000 | Davidson, Jr. et al. | |
| 6,115,132 A * | 9/2000 | Nakatsuma et al. | 358/1.14 |
| 6,184,996 B1 * | 2/2001 | Gase | 358/1.15 |
| 6,600,569 B1 * | 7/2003 | Osada et al. | 358/1.12 |
| 6,665,724 B2 * | 12/2003 | Lawrence | 709/230 |
| 6,678,068 B1 * | 1/2004 | Richter et al. | 358/1.15 |
| 6,707,574 B1 * | 3/2004 | Freeman et al. | 358/1.9 |

* cited by examiner

*Primary Examiner*—Chan S Park
(74) *Attorney, Agent, or Firm*—Merchant & Gould

(57) ABSTRACT

A Job Monitor for providing printer recognition and management of a print job entity is described. The Job Monitor includes a repository of attributes and status associated with each print job that passes through the system. Interfaces to the Job Monitor provide the ability for components to process a job according to the unique requirements of the processing component, and report job attributes and processing status of the job to the Job Monitor for common access by other components. Each component has access to common variables and can present job attributes or status to its respective external interface according to the unique requirements dictated by the external interface. Additionally, internal job processing components interface with the Job Monitor to access and report current processing status. The common status repository provided by the Job Monitor is used by the Job Monitor and other components to control the sequence of processing within the printer.

19 Claims, 10 Drawing Sheets

| Attribute | Description | Initial Value |
|---|---|---|
| Job ID | Job ID | JobID |
| PCM ID | ID of the PCM through which the job was received | Null |
| Personality | Personality of the PCM through which the job was received | Null |
| PCM Priority | Priority of the PCM through which the job was received | Null |
| MUX receive byte count | Number of bytes received by the MUX through calls to the apsPDIData routine by a primary source PCM. This includes all PCMs except the despooler (it is not a primary source PCM) | 0 |
| URL of the job | URL of the job (pull print only) | Null |
| Output request attribute for the job | Output requested by PCM for the job(Printer, Spooler, Either) | PRINTER |
| Output assignment attribute | Output assignment attribute for the job (Printer, Spooler, Wait, Rejected) | Null |
| File format indicator (PDF) | File format indicator (PDF) | NORMAL |
| MUX Job State | State of the job in the MUX | Unknown |
| Spooler Job State | State of the job in the spooler | NotSpooled |
| Interpreter Job State | State of the job in the interpreter | WaitingForJob |
| Engine Job State | State of the job in the engine | WaitingForJob |
| PMDD bytes read | This is the number of bytes read by the interpreter through calls to the PMDD Read routine | 0 |
| MUX printer output status | Status of output to printer (not started, in progress, completed) | NotStarted |
| MUX Spooling status | Status of job being spooled (not started, in progress, completed) | NotStarted |
| Timestamp | Timestamp (printer up time ) of last attribute update | Uptime |

Fig. 3

| Process | From State | To State | Changed by |
|---|---|---|---|
| MUX | Unknown | Pending Printer | MUX OS Thread |
| | Unknown | Pending Any | MUX OS Thread |
| | Unknown | Pending Spooler | MUX OS Thread |
| | Unknown | Pending Pull Print | Pull Print wppSubmitJob |
| | Pending Printer | Receiving Data | MUX OS Thread |
| | Pending Any | Receiving Data | MUX OS Thread |
| | Pending Spooler | Queued to Spool | MUX OS Thread |
| | Pending Any | Queued to Spool | MUX OS Thread |
| | Queued to Spool | Pending Printer | MUX OS Thread |
| | Receiving Data | Done | MUX apsPDlEnd |
| Spooler | Not Spooled | Spooling Can Despool | sp-open |
| | Spooling Can Despool | Spooling / Despooling | sp-eoj |
| | Spooling Can Despool | Waiting to Despool | sp-eoj |
| | Spooling / Despooling | Despooling | Despool PCM |
| | Not Spooled | Spooling Can't Despool | sp-open |
| | Spooling Can't Despool | Waiting to Despool | sp-eoj |
| | Waiting to Despool | Despooling | Despool PCM |
| | Despooling | Done | Despool PCM |
| Interpreter | any | any | event announce callback |
| Engine | any | any | event announce callback |

Fig. 8

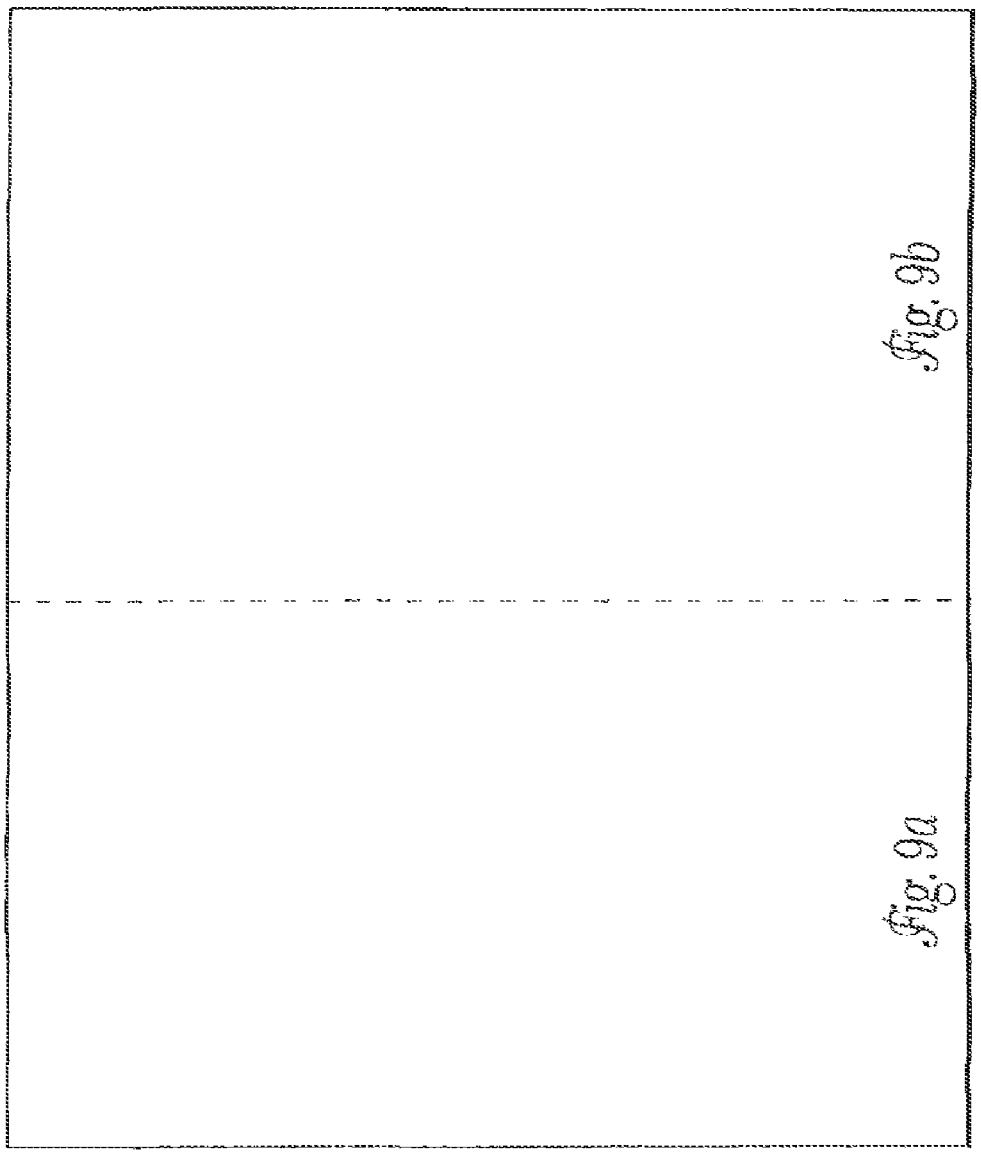

| Attribute ID | Type | Rel. | RO/RW | IPP | SNMP | Notes |
|---|---|---|---|---|---|---|
| JM ATTR JOB-ID | Int (Enum) | 1 | RO | | | Set by JM. |
| JM ATTR-PCM-ID | Int (Enum) | 1 | RW | | | Set by MUX. |
| JM ATTR-PCM-PERSONALITY | Int | 1 | RW | | | Set by MUX. |
| JM ATTR-PCM-PRIORITY | Int | 1 | RW | | | Set by MUX. |
| JM ATTR-SPOOLED-BYTES | String | 1 | RW | | | Set by MUX. |
| JM ATTR-URL | Int (Enum) | 1 | RW | | | Set by WPP. |
| JM ATTR-OUTPUT-REQUEST | Int (Enum) | 1 | RW | | | Set by MUX. Enum will contain PRINTER,SPOOLER, WAIT, REJECTED. Others will be added if needed. |
| JM ATTR-FILE-FORMAT | Int (Enum) | 1 | RW | | | Set by MUX. Enum will contain at least UNKNOWN and PDF. Others will he added as needed. |
| JM ATTR-MUX-STATE | Int (Enum) | 1 | RW | | | Set by MUX Enum will he created to list the possible states. |
| JM ATTR-SPOOL-STATE | Int (Enum) | 1 | RW | | | Set by SPOOLER. Enum will be created to list the possible states. |
| JM ATTR-INTERPRETER_STATE | Int (Enum) | 1 | RO | | | Set by JM. Enum will be created to list the possible states. |
| JM ATTR-ENGINE-STATE | Int (bit fields or | 1 | RO | Yes | Yes | Set by JM. Enum will be created to list the possible states. |
| JM ATTR-JOB-STATE | Int | 1 | RO | | | Done by JM. Convert from JM-ATTR * STATE attributes |
| JM ATTR-PAGES-SUBMITTED | Int | 1 | RO | | | Set by JM. This is the number of pages submitted into the pipeline by the interpreter (incremented once for each page, regardless of the COPY count). |

Fig. 9a

| Attribute ID | Type | 1 | RO/RW | IPP | SNMP | Notes |
|---|---|---|---|---|---|---|
| JM ATTR-TOTAL-PAGES IN JOB | Int | 1 | RO | | | Set by JM. This is the total number of pages, including all copies of each page, which have been submitted into the pipeline. |
| JM ATTR-TOTAL-PAGES STACKED | Int | 1 | RO | | | Set by JM. This is the total number of pages that have been stacked by the engine (incremented for each copy of a page. |
| JM ATTR-RECEIVED BYTES | Int | 1 | RW | | | Set by MUX. The MUX should ensure that this is not double when we are spoolling (i.e., the bytes should only be counted when they are received from the host, not from the spooler.) |
| JM ATTR-BYTES-PROCESSED | Int | 1 | RW | | | Set by PMDD |
| JM ATTR-LAST-MODIFIED | IntInt (Enum) | 1 | RO | Yes | Yes | Set by JM. This is a timestamp (or count) used to tell if data modified since last checked this value. |
| JM ATTR-CANCEL-INITIATOR | Int | 1 | RW | | | Set by requester of cancel. This is who requested the cancel (operator, user, device) |
| JM ATTR-CANCEL | Int | 1 | RW | | | Set by JM (or IPDS?), 0 if not cancelling, 1 if cancel initiated. |
| JM ATTR-OPEN COUNT | Int | 1 | RO | | | Set by JM. Not read by others. Used to know how many people have this handle open (have not called destroy yet). |
| JM ATTR-COPY-SET | Int | 1 | RO | | | Set by JM. This is the set for the last page stacked it doing collation. |
| JM ATTR-COPY-COUNT | Int | 1 | RO | | | Set by JM. This is the copy count for the last page stack if doing collation. |
| JM ATTR-COLLATE | Int | 1 | RW | | | True if collated job, false otherwise. |
| JM ATTR-DUPLEX | Int | 1 | RW | | | True if job is duplex, false otherwise. |

Fig. 9b

METHOD AND APPARATUS FOR PROVIDING PRINTER RECOGNITION AND MANAGEMENT OF A PRINT JOB ENTITY

RELATED APPLICATION

This application is a continuation of U.S. application Ser. No. 09/753,470, filed Jan. 3, 2001, which is hereby incorporated by reference.

FIELD OF THE INVENTION

This invention relates in general to a printing systems, and more particularly to a method and apparatus for providing printer recognition and management of a print job entity.

DESCRIPTION OF RELATED ART

Printers receive print data from a source, such as a single host computer or from a network that contains at least one host computer or network server. One recent development with respect to laser printers is the addition of a "memory option," which is an internal memory device such as flash RAM (Random Access Memory) or a hard disk drive, in which each type of memory can store files containing printed data. In some conventional printers, the memory device (e.g., hard disk) is of a sufficient size to store many print jobs at one time. Moreover, the "normal" temporary memory storage device (i.e., typically volatile RAM) used to store incoming print jobs may also be of a sufficient size to store many print jobs at one time, even as the printer is in the process of printing an earlier received print job.

In typical desktop personal computer (PC) environments, print jobs are submitted (via either a direct connection or via a network) to a printer that contains sufficient memory to accept more than one entire print job, and by using this capability, a quick "screen release" is achieved. The term "screen release" represents the concept that, once a print job is accepted by a printer, the desk top PC is "released" by that printer, and the PC is no longer waiting for the printer to continue accepting the data. Until conventional printers accept all of the data for a particular print job from the host computer (i.e., the PC), the host computer can be unusable by its human user ("locked up") until the active printing session is complete. An active printing session becomes "complete" generally when the print job has been completely accepted by the printer. At that time, the printer's hardware communicates to the host PC's hardware that the job has been accepted.

The desire to achieve a quick screen release has produced various solutions in the printer field of art. One conventional solution is to implement a "print spooler" in various operating systems, including PC operating systems (e.g., Microsoft Windows 95™, IBM OS/2™), as well as network operating systems (e.g., Novell Netware™, and IBM LAN Server™). Another conventional solution is to add more memory to the printers so as to allow the printers to completely accept various print jobs long before they are physically printed.

In addition, a printer may contain one or more attachments over which print data is received. Attachments may be physical or logical. Examples of attachments are Ethernet, Twinax, Parallel port, and the despooler. Attachments represent a subset of a more abstract entity called a data channel. Print data is passed through a data channel to the multiplexer.

Modern low end printers accept print jobs from a variety of heterogeneous host system, over a variety of transmission channels, using a variety of Print Description Languages (PDLs). Operating in this mixed environment, the printer must determine the boundaries of the job, identify the correct PDL to process the job, identify various attributes associated with the job, manage the job through the printing process and provide status of the job through external interfaces.

In a typical printer, a print job is viewed as a stream of data that is directed through a specific data channel to a specific PDL for processing. However, complex interactions occur between internal components in order to control the processing of the job. Further, the attributes of a job are typically uniquely handled, based on the type of job. This makes job processing very complex.

It can be seen then that there is a need for a method and apparatus for providing printer recognition and management of a print job entity.

It can also be seen then that there is a need for a method and apparatus that addresses the complexity of job processing by viewing the job on a higher conceptual plane, wherein a repository of attributes and status associated with each print job that passes through the system is contained and managed.

SUMMARY OF THE INVENTION

To overcome the limitations in the prior art described above, and to overcome other limitations that will become apparent upon reading and understanding the present specification, the present invention discloses a method and apparatus for providing printer recognition and management of a print job entity.

The present invention solves the above-described problems by addressing the complexity of job processing by viewing the job on a higher conceptual plane, wherein a repository of attributes and status associated with each print job that passes through the system is contained and managed. A method according to the present invention includes establishing a repository of attributes and status information associated with each print job that passes through a printer system and providing an interface to a plurality of components to allow access to the attributes and status information in the repository by the plurality of components.

Interfaces to the Job Monitor provide the ability for components to process a job according to the unique requirements of the processing component, and report job attributes and processing status of the job to the Job Monitor for common access by other components. Through this mechanism, attributes of a job that is, for example, received over the parallel interface can be accessed by the SNMP component, the Web page component, or the IPP component. The SNMP. Web page and IPP components have access to the complete set of job variables that is maintained by the Job Monitor. Each component has access to common variables and can present job attributes or status to its respective external interface according to the unique requirements dictated by the external interface.

Additionally, internal job processing components interface with the Job Monitor to access and report current processing status. The common status repository provided by the Job Monitor is used by the Job Monitor and other components to control the sequence of processing within the printer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates one embodiment of a table that identifies the attributes maintained for each job according to the present invention;

FIG. 8 illustrates a table summarizing state changes for each of the processes; and FIG. 9 illustrates a table listing the attributes of a job according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing printer recognition and management of a print job entity. The present invention addresses the complexity of job processing by viewing the job on a higher conceptual plane. Instead of managing a collection of attributes and status variables that is unique for each data channel, or each PDL, a Job Monitor is created, which contains and manages a repository of attributes and status associated with each print job that passes through the system. The advantage of this implementation is that it simplifies and centralizes the attribute and status elements associated with all jobs that are processed by the printer. Furthermore, the Job Monitor provides a common method of accessing variables associated with a job to all processing components within the printer.

Figure 1:
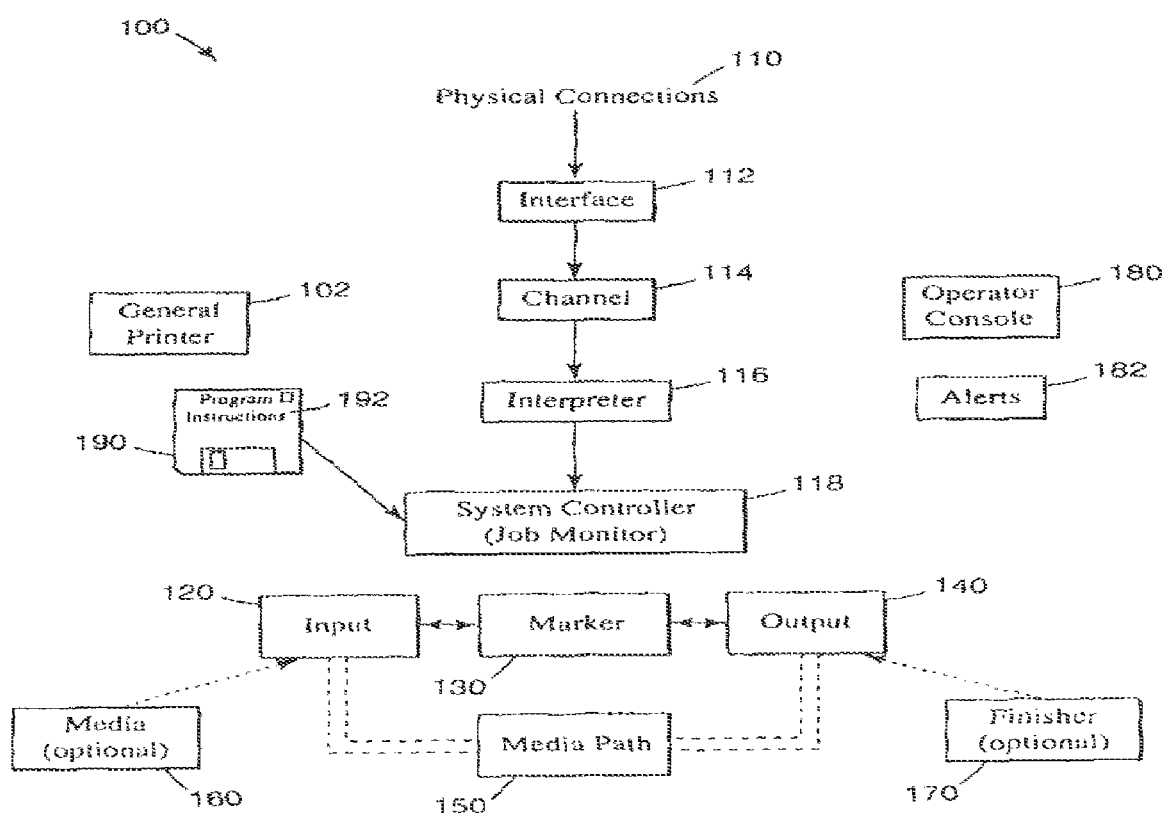
FIG. 1 illustrates a block diagram of a printer according to the present invention.

FIG. 1 illustrates a block diagram of a printer 100 according to the present invention. Those skilled in the art will recognize that the subunits of the printer illustrated in FIG. 1 may not necessarily relate directly to any physically identifiable mechanism. Sub-units can also be a set of definable logical processes, such as interpreters for page description languages or command processors that set various operating modes of the printer.

FIG. 1 illustrates the three basic functions of the printer: (1) the flow of a print file into an interpreter and onto the marker, (2) the flow of media through the marker and (3) the auxiliary sub-units that control and facilitate the two flows. As shown in FIG. 1, the flow of the print data comes through a physical connection 110 on which some form of transport protocol stack is running to a printer interface 112. The data provided by the transport protocol (interface) appears on a channel 114. The channel 114 provides the data stream to the input to an interpreter 116. The interpreter 116 is responsible for the conversion of a description of intended print instances into images that are to be marked on the media. A printer may have one or more interpreters.

As shown in FIG. 1, the media 160 initially resides in Input sub-units 120 from which the media 160 is selected and then transported via a Media Path 150 first to a Marker 130 and then onto an Output 140 with (optionally) some finishing operations 170 being performed. The Input 120 is a mechanism that feeds media to be marked on into the printer. There may be as many Inputs 130 as there are distinctly selectable input "addresses". The Media 120 is an extension of the Input 120 which represents that media that is in an Input 120. The Output 140 is a mechanism that receives media that has been marked on. A printer may contain one or more Output mechanisms 140. There are as many Outputs 140 as there are distinctly selectable output "addresses". A finisher 170 is a unit that performs some operations on the media other than marking. Some examples of finishing processes are stapling, punching, binding, inserting, or folding.

A Marker 130 is the mechanism that produces marks on the print media. A printer can contain one or more Markers 130. Some examples of multiple marker subunits 130 are: a printer with separate markers for normal and magnetic ink or an image setter that can output to both a proofing device and final film. Each Marker 130 can have its own set of characteristics associated with it, such as marking technology and resolution. The media paths 150 encompass the mechanisms in the printer that move the media through the printer and connect all other media related units: Inputs 120, Outputs 140, Markers 130 and Finishers 170. A printer may contain one or more media paths 150. In general, the design of the media paths 150 determines the maximum speed of the printer as well as the maximum media size that the printer can handle. Media paths 150 are complex mechanisms and can contain many different identifiable sub-mechanisms such as media movement devices, media buffers, duplex units and interlocks. Not all of the various sub-mechanisms reside on every media path 150. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Printer 102, Operator Console 180 and Alerts 182, facilitate control of the printer, inquiry/control of the operator panel, reporting of alerts, and the adaptation of the printer to various natural languages and characters sets. The General Printer 102 is responsible for the overall control and status of the printer. The Operator Console 180 is used to display and modify the state of the printer. The console 180 can be as simple as a few indicators and switches or as complicated as full screen displays and keyboards. The Alert unit 182 is responsible for detecting reportable events, making an entry in the alert table and, if and only if the event is a critical event, initiating a trap.

All of the above described functions run on the System Controller 118 which represents the processor, memory and storage systems of the printer. The System Controller 118 implements the control functions for processing a print job. The System Controller 118 includes the MIB, which provides the specification of the processor(s), memory, disk storage, file system and other underlying sub mechanisms of the printer. The System Controller also includes a Job Monitor, which contains and manages a repository of attributes and status associated with each print job that passes through the system. Thus, the System Controller 118 through the Job Monitor, as will be explained in more detail below, simplifies and centralizes the attribute and status elements associated with all jobs that are processed by the printer. Furthermore, the System Controller 118 through the Job Monitor, provides a common method of accessing variables associated with a job to all processing components within the printer.

The System Controller 118 can range from simple single processor systems to multiprocessor systems. In addition, controllers can have a full range of resources such as hard disks. Those skilled in the art will recognize that a printer may have more than one processor and multiple other resources associated with it.

A process for examining data in the incoming job and processing the attributes of the job, configuration parameters in the printer and the state of the printer engine and spooler to determine how to processing the incoming print jobs is performed by the System Controller 118. The process, as will be described below with reference to FIGS. 2-9, may be tangibly embodied in a computer-readable medium or carrier, e.g. one or more of the fixed and/or removable data storage devices 190, or other data storage or data communications devices. The computer program 192 of the storage device 190 may be loaded into System Controller 118 to configure the System Controller 118 for execution. The computer program 192 comprise instructions which, when read and executed by the System Controller 118 causes the System Controller 118 to perform the steps necessary to execute the steps or elements of the present invention.

Figure 2:
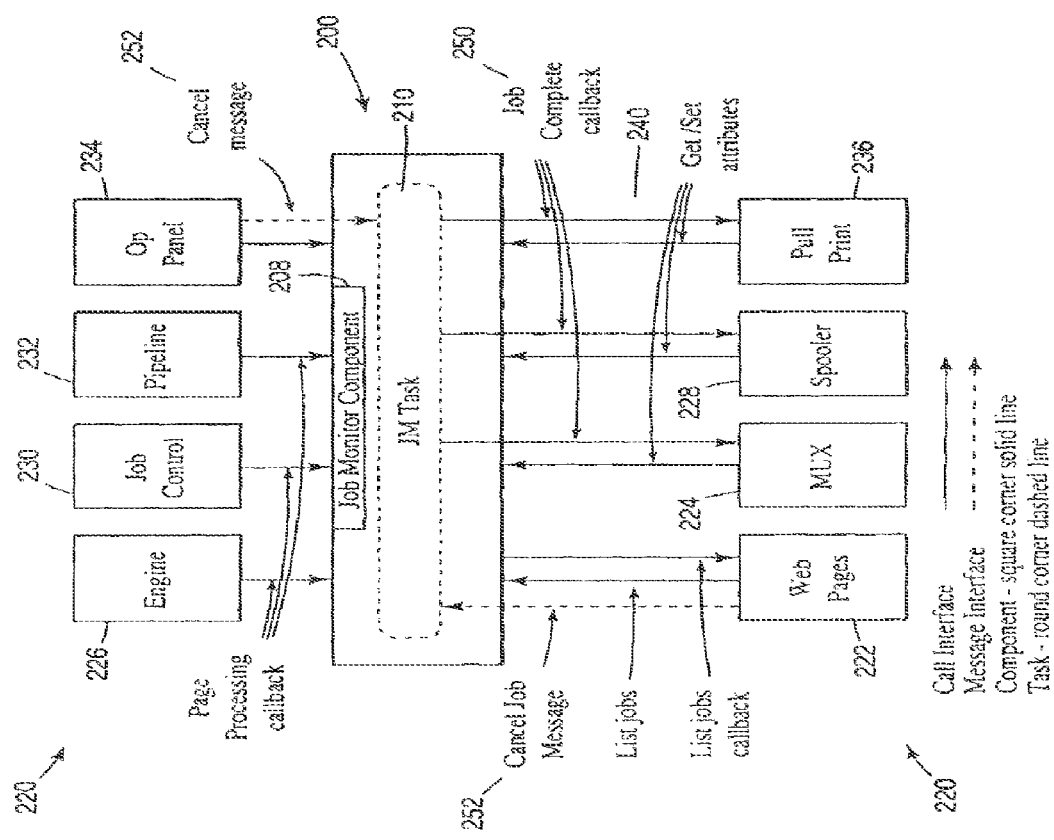
FIG. 2 illustrates a system controller including a Job Monitor according to the present invention.

FIG. 2 illustrates a Job Monitor 200 for a system controller according to the present invention. The Job Monitor includes a collection of routines 208, described as an Application Program Interface (API), and a single JM task 210. In FIG. 2, interfaces between the Job Monitor 200 and other components 220 in the system are illustrated. However, those skilled in the art will recognize that the present invention is not meant to be limited to the interfacing components 220 shown in FIG. 2. Rather the interfacing components 220 illustrated in FIG. 2 are provided merely as examples.

Interfaces to the Job Monitor include Web Page channels 222, a multiplexer 224 to manage the routing of jobs to the print engine 226 and the spooler 228. A job control function interface, 230, a pipeline interface 232, an operations panel interface 234 and a pull print interface 236 are also shown in FIG. 2.

Interfaces 220 to the Job Monitor 200 provide the ability for components to process a job according to the unique requirements of the processing component, and report job attributes and processing status of the job to the Job Monitor 200 for common access by other components 220. Through this mechanism, attributes of a job that is, for example, received over the parallel interface 240 can be accessed by the SNMP component, the Web page component, or the IPP component. The SNMP, Web page and IPP components have access to the complete set of job variables that is maintained by the Job Monitor 200. Each component 220 hats access to common variables and can present job attributes or status to its respective external interface according to the unique requirements dictated by the external interface.

Additionally, internal job processing components interface with the Job Monitor to access and report current processing status. The common status repository provided by the Job Monitor 200 is used by the Job Monitor 200 and other components 220 to control the sequence of processing within the printer.

The Job Monitor 200 component is a central repository for information relating to all jobs within the printer. A subcomponent of the Job Monitor 200 also provides a gateway through which other components can obtain information about the printer. The design of the Job Monitor 200 is intended to satisfy a broad set of requirements. These include IPP v1, the SNMP job MIB, the controller web interface for job Status, "next job to process" selection requests of internal components, and initiation of job cancellation. More specific requirements include the ability for interfacing components to create job entries, obtain and set job attributes, manipulate the state and status of jobs in the system, and obtain job ordering information pertinent to the calling component. The Job Monitor 200 provides a global view of jobs within the printer, including the actively printing job, jobs in the process of being spooled, jobs on the spool queue, and jobs on the pull print queue. The printer related interface of the Job Monitor 200 is primarily intended to satisfy the IPP requirements for getting and setting printer attributes through the use of a consistent set of APIs.

The design of the Job Monitor 200 is intended to be transparent to the existing implementation of PCMs. Some PCMs do not have an inherent need for access to job or printer information. However, some PCMs (such as LPD) have internal knowledge of certain job characteristics that could be used by other parts of the system. The interface to the Job Monitor 200 accommodates either implementation of these PCMs, and also provides the possibility of passing job information from the PCM to the Job Monitor 200. Still other PCMs, which provide new functions to the controller, require certain attributes (such as JobIDs) that are provided by the Job Monitor 200.

The Job Monitor 200 provides the following general functions: obtaining a Job ID, performing a query for attributes of a job, updating job attributes, cancelling jobs, providing logical views of a job, handling printer events, getting attributes of the printer and setting printer attributes. With regard to obtaining a Job ID, a JobID is a unique identifier associated with a print job. A JobID is assigned for all print jobs. A JobID is assigned automatically for any job whose associated PCM does not explicitly request such an assignment. The JobID may be provided to the end user through a web page or other external means. Therefore, a single JobID is used to uniquely identify and track any job in the system, regardless of the printer interface or protocol through which the job is submitted (e.g. IPP, Web Push, LPR, NetWare, etc.).

Job attributes are updated through the Job Monitor 200. Different job attributes are known to different internal interface components 220. This Job Monitor 200 provides the ability for any internal component 220 to set job attributes that the component knows about. For example, a PCM may know the name of the job submitter, while the engine component 226 knows when the job state is complete. These components can independently update the attributes of the job.

Interfaces are also provided to cancel the current job, and to cancel jobs with a specific attribute value. For a request to cancel the current job, the Job Monitor 200 determines what JobID is associated with the current job and takes the necessary action to cancel it. For a request to cancel jobs with a specific attribute, the Job Monitor 200 checks the specified attribute value with each job in the system. The appropriate job cancel action is executed for each job with a matching attribute. For example, to cancel a specific job, an attribute of JobID and an attribute value of the JobID to cancel are specified.

Logical views provide the ability to obtain the next job to be processed by a component, and to obtain a list of all jobs in the order that they are processed. For example, the visibility of jobs to the Spooler 228 is limited to the next job to be despooled according to the current despooling algorithm; the visibility of jobs to the Pull Print PCM 236 is limited to the next (oldest) pull print job in the pull print queue; the visibility of jobs to the web page includes all jobs, in the order that they are expected to print. In addition, printer events, such as "page delivered to exit tray", are handled by the Job Monitor 200.

The internal details of the Job Monitor 200 will be described in detailed herein below. However, an example for the purpose of understanding the interface will now be described using a table of jobs as a conceptual model. FIG. 3 illustrates one embodiment of a table 300 that identifies the attributes maintained for each job according to the present invention. Rows 310 in the conceptual job table represent jobs. Columns 312 in the table represent attributes. Cells 314 in the table represent the attribute value for the specified job. The table 300 contains information about all jobs currently in the printer. Although not illustrated in FIG. 3, the table 300 may also contain some job history, using an aging algorithm to remove old history from the table. A physical row 312 (in this mythical table) may contain information about job x now, and job y at some later time. After job x has printed and the history is no longer needed, the row is reused (overlaid) with information about a new job—job y. The table 300 may be expanded to include additional attribute lists as needed or desired. Typically, only a subset of the attributes are populated for any one job. As can be seen, the table identifies the value that is set for each of the attributes at the time that a JobID is assigned (call to JM_CreateJobObject).

Attributes and attribute values associated with a job or the printer are divided into two general categories: 32-bit integer and n-length character strings. For performance reasons it is desirable to use binary values (such as 32-bit integer) rather than strings. However, some elements can only be expressed as a string. Where possible, an enumerated list is used to express attribute names as well as attribute values rather than character strings. All such enumerated lists are represented by 32 bit integers in this interface.

A PCM (such as Pull Printing or IPP) may request the assignment of a JobID 320. This is done by requesting the creation of a new JobID 322 through a call to the JM_CreateNewJob routine. Obtaining the ID of the job is a 2-step process. The call to JM_CreateJobObject creates a job handle for a new job and assigns a job number. However, only the job handle is returned. A second call (to JM_GetAttrint32 with JobID as the attribute to get) is used to obtain the JobID attribute associated with the handle. The handle is a 32 bit memory address of a structure. The caller should view the handle as an opaque object, the address of which is returned on the initial call. The handle must be passed as a parameter in subsequent calls to get or set job attributes.

Attributes for an existing job are also obtained by calling the Job Monitor. Access is provided through a similar two step process. A call to JM_GetHandleFromID creates a job handle for the existing job, similar to the description above. If the job does not exist, then an error is returned. If the job exists, then the handle is used in subsequent calls to the Job Monitor. A call to JM_DestroyObject releases the job handle. All calls to the Job Monitor that return a handle must be matched (sooner or later) with a subsequent call to release the handle. A job object is not destroyed by the Job Monitor until all handles for the object are released. This insures that the job table entry is not deleted or reused for a new job when the entry is still in use by another task.

A PCM may request an attribute for a job by specifying the job handle, the job attribute, and a storage location into which the specified attribute value is to be placed. Due to different requirements for storing integers and strings, a set of APIs are provided for dealing with integer attributes and string attributes. Additionally, a set APIs are provided for setting attributes and for getting attributes. A set of APIs also provide the ability to set or get multiple attributes in a single call.

Job tracking within the system begins when a JobID 322 is assigned. A job may be handled by several major processes between the time that the job is initially identified until it is printed. The processes include:
1. Processing by the multiplexer for the receipt of a job, or the despooling of a job.
2. Processing by the spooler to receive or despool a job
3. Processing by an interpreter to interpret a PDL
4. Processing by the engine to put image on paper and move paper through the system Separate job states apply to each of these major processes. In general, each process is responsible for updating its process state for the job as the job progresses through the system. Exceptions are noted in the description. The Job Monitor uses the job states to control the flow of jobs through the system. The process job states are also used by the caller to construct a response to a query (get) of the job state for IPP, SNMP, etc.

Referring to FIG. 2 again, the multiplexer 224, Pull Print 236 and Spooler 228 components each call the GetNextJob routine of the Job Monitor 200 to request the JobID of the next job to be processed. The Job Monitor 200 response to this call is determined by the process states. While it is the responsibility of the Job Monitor 200 to determine the next job to be processed, it is the responsibility of the calling components, not the Job Monitor 200, to insure that process states are correctly maintained. The Job Monitor 200 is not aware of what state changes are valid, and therefore cannot check the validity of state changes. For example, back to back calls to the GetNextJob routine by a component returns the same JobID. It is the responsibility of the calling component to update the job state after a call to the GetNextJob routine. The state change is required to reflect that the job is now being processed, and it causes the Job Monitor 200 to respond differently to the next call to GetNextJob.

FIGS. 4-7 illustrate the states for interfaces to the Job Monitor 200 according to the present invention. In cases where a job may be in more than one state at a time within a process, the job is placed in the state nearest the job completion. For example, a job that is being processed by the engine and at least one page has been delivered to the output tray is in the Pages Printing state.

FIGS. 4-7 show the states of a job from the time of arrival until the job processing is completed for each of the processes. It is possible for a job to transition through some states in zero time. For instance, if the printer is idle at the time that a simple print job arrives, the multiplexer Job State transitions from Unknown, through Pending Printer to the Receiving state in zero time.

Figure 4:
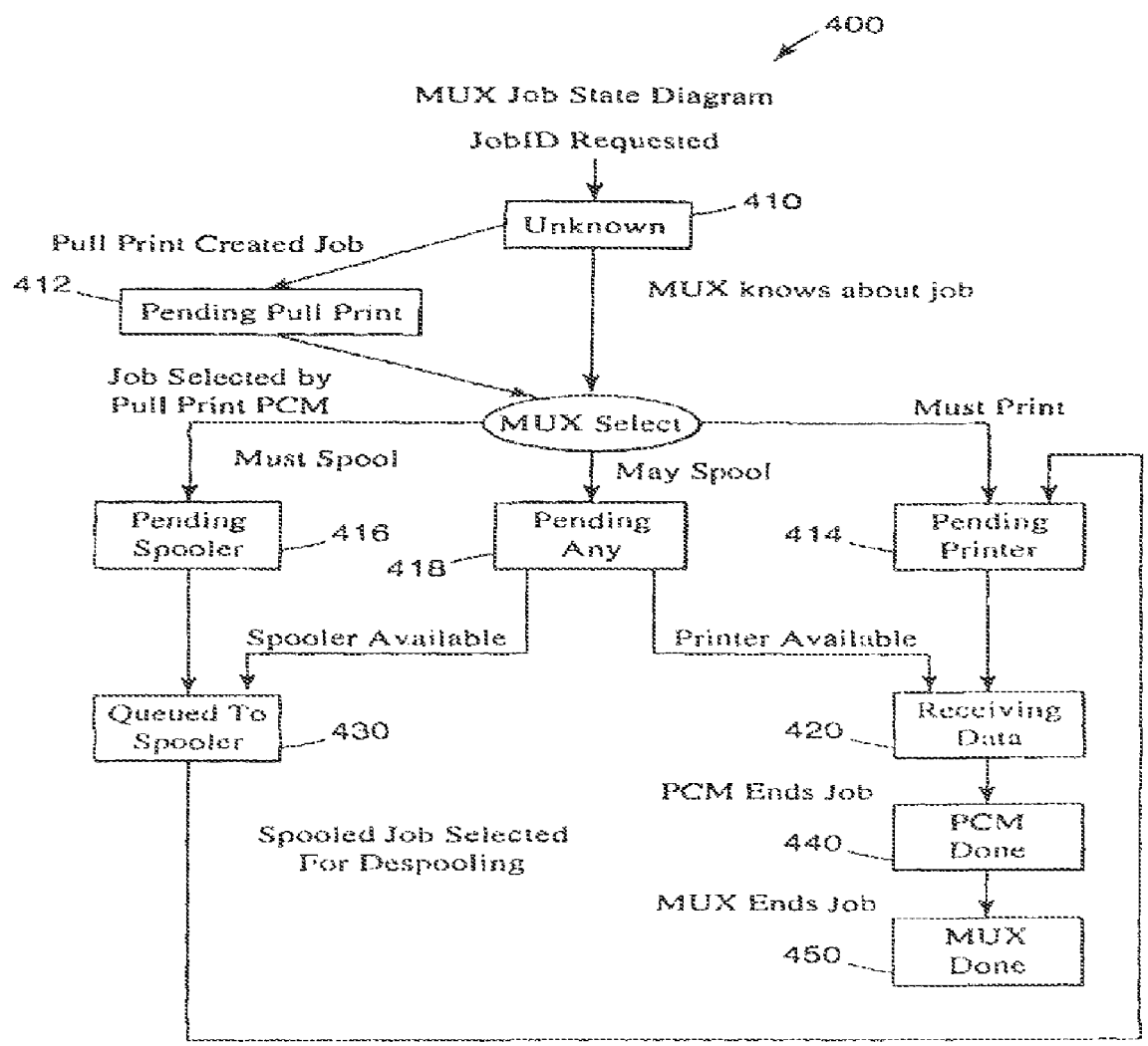
FIG. 4 illustrates a state diagram for the multiplexer.

FIG. 4 illustrates a state diagram for the multiplexer 400. In FIG. 4, the unknown state 410 represents that the state of the job is not yet known. A job enters this state when a JobID is requested (a new row in the Job Table is created). The caller is expected to update the job state as soon as the state is determined. The Pending Pull Print state 412 indicates that the job is in the Pull Print queue, It may be selected for processing, subject to the pull print job selection algorithm. The Pending Printer state 414 indicates that the job is stop-flowed at a PCM, waiting for access to the printer because the printer is processing some other job. The Pending Spooler state 418 indicates that the job is stop-flowed at a PCM, waiting for access to the spooler because the spooler is busy processing other jobs. The Pending Any state indicates that the job is stop-flowed at a PCM, waiting for either the printer or the spooler, whichever comes available first. The Receiving state 420 indicates that the job is being received by the multiplexer.

Under normal conditions the output from the multiplexer is delivered to the ring buffer. An exception occurs if the job is being cancelled. In this case, the data is not written to the ring buffer. The Queued to Spool state 430 indicates that the job is either being received by the multiplexer and written to the spool, or it has been fully received by the multiplexer and written to the spool. The PCM Done state 440 indicates that the PCM has detected the end of the job. This state is entered when the apsPDIEndOfJob routine is called. The Done state 450 indicates the multiplexer processing of a job is completely finished. Under normal circumstances this occurs when the multiplexer is notified of the job completion by the IOSchedulerProc routine. The multiplexer state for a job that is on the spool is Queued to Spool 430.

Figure 5:
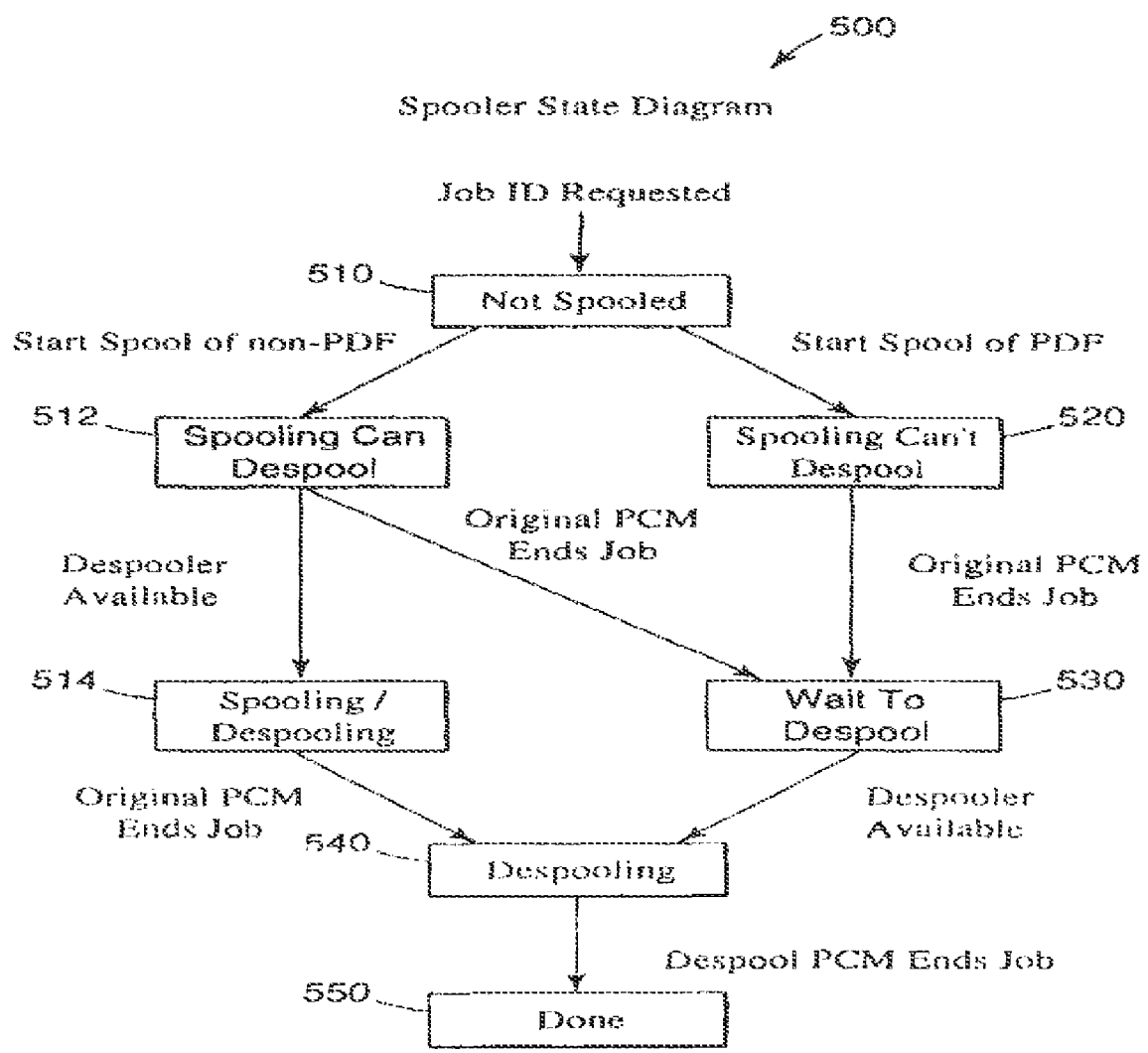
FIG. 5 illustrates the Spooler Job States.
Figure 6:
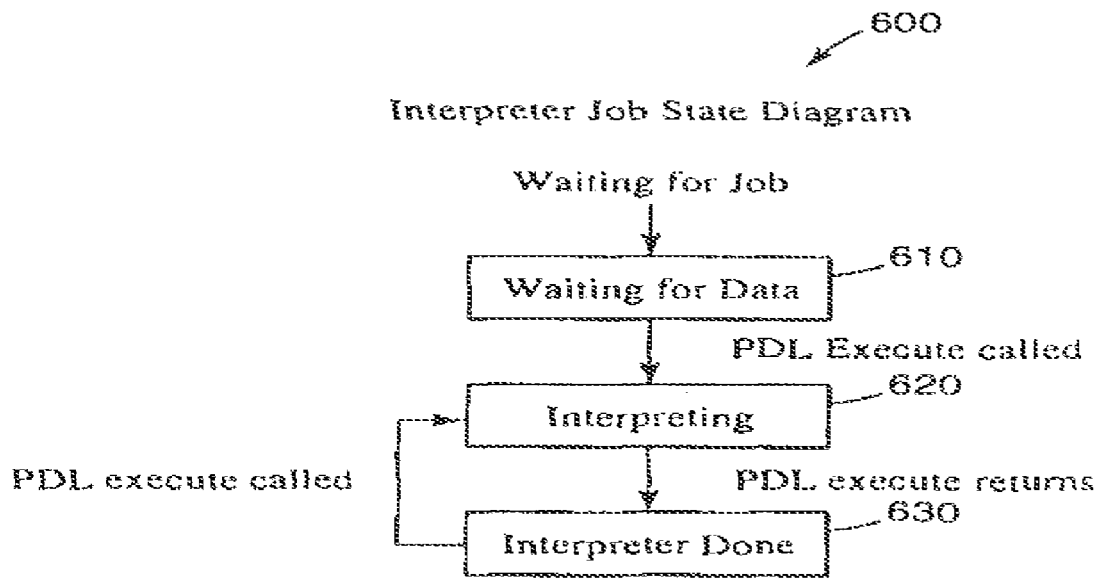
FIG. 6 illustrates the Interpreter Job States.

FIG. 5 illustrates the Spooler Job States 500. The Not Spooled state 510 indicates the spooler has not yet processed the job. This is the initial Spooler state for all jobs. A job that is printed directly and not processed by the spooler remains in this Spooler state. The Spooling, Can Despool state 512 indicates that the job is being written to the spool device. The job can be selected for despooling at any time. The Spooling, Despooling state 514 indicates that the job is being written to the spool device and is also being read from the spool device. The Spooling, Can't Despool state 520 indicates that the job is being written to the spool device. The job cannot be selected for despooling until the job is fully spooled. The Waiting to Despool state 530 indicates that the end of the job has been received. The job may be selected for despooling at any time. The Despooling state 540 indicates that the job is being read from the spool device and written to the multiplexer. The Done state 550 indicates that the job is finished being processed by the spooler FIG. 6 illustrates the Interpreter Job States. The Waiting for Data state 610 indicates that job processing by the interpreter has started. The Interpreting state 620 indicates that the job is being processed by the interpreter. The Done, state 630 indicates that the job is finished being processed by the interpreter.

Figure 7:
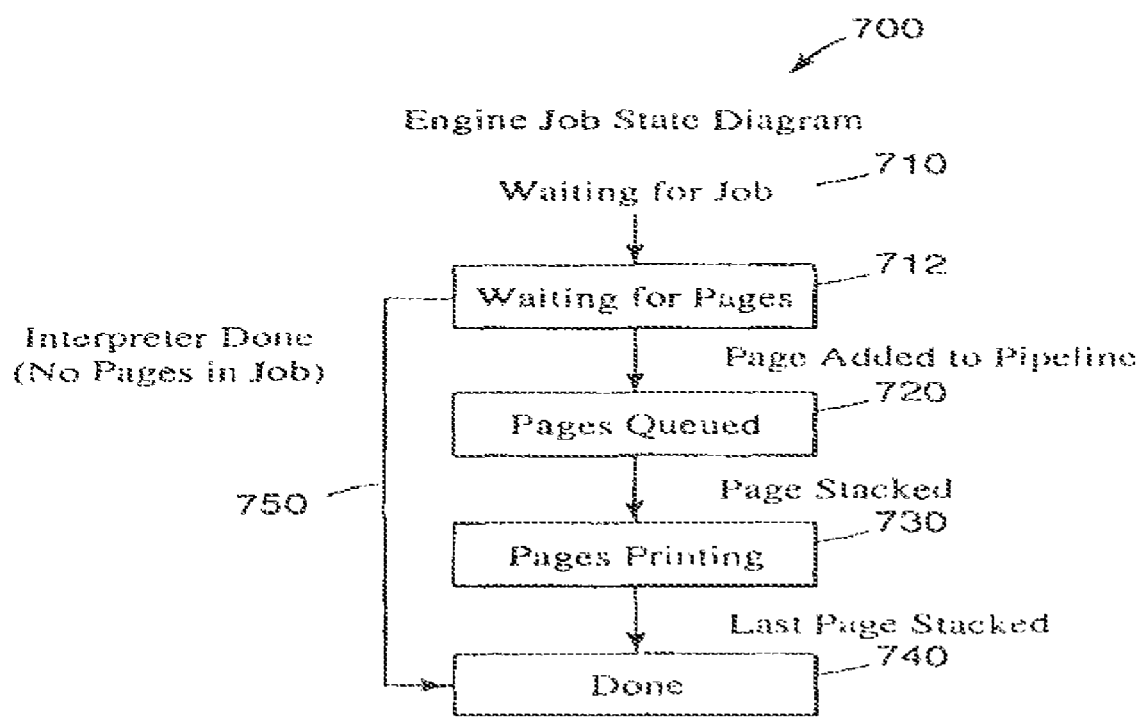
FIG. 7 illustrates the Engine Job States.

FIG. 7 illustrates the Engine Job States 700. The Waiting for Job state 710 indicates that job processing by the interpreter has not yet started. The Waiting for Pages state 712 indicates the job has started. The Pages Queued state 720 indicates that one or more pages for the job have been created by the interpreter and written to the page buffer. The Pages Printing state 730 indicates that one or more pages for the job have been delivered to the output tray. The Done state 740 indicates that the last page for the job has been delivered to the output tray.

The following description explains the significant points associated with state changes for each of the processes described above. All incoming jobs are processed by the multiplexer while executing on a PCM task. A job may be stopped at the multiplexer level because an output path to either the printer or the spooler (depending on the job) is not available Jobs that are stopped at this level are marked with one of the "pending" states. When a job is selected for printing, it moves to the multiplexer Receiving state 410. As the head of the job moves to the Interpreter, the Interpreter state changes from Waiting for Job 610 to interpreting 620. As the head of the job moves to the engine, the Engine Job State moves from Waiting for Job 710 to Pages Queued 720, then Pages Printing 730.

When the PCM calls the apsPDIEndOfJob routine the multiplexer Job State moves to Done 450. At this time, all of the data for the job has been received. However, this is prior to the time that the multiplexer recognizes the end of the job (and therefore looks for the next job). Changing the multiplexer state at PCM end-of-job time allows IPP to determine that all data for the job has been received When the end of the job is processed by the Interpreter, then the Interpreter Job State moves to Done 630. When the last page of the job is delivered to the output tray, the Engine Job State moves to Done 740. If the job does not produce any output, then the Engine Job State moves from Waiting for Job 710 to Done 740 without going through the intervening states 750.

When a job is processed by the spooler, the Spool Job State, moves from Not Spooled 510 to the Spooling Can Despool state 512 if the job is not a MUST PRINT, e.g., a PDF file. This type of file is eligible for despooling immediately. If the job is selected for despooling, then the state moves to Spooling/Despooling 514. This state indicates that the job is being written to the spoof at the same time that it is being read from the spool. When the end of the job has been written to the spool, the spooler component changes the Spooler state to Despooling 540. When the despooling operation is complete, the job state is set to Done 550. If the job is not selected for despooling during the time that it is being spooled, then the state moves to Waiting to Despool 530 at the end of the spooling operation.

If the job is a PDF file, then the Spooler sets the state to Spooling, Can't Despool 520 when it begins processing the job. At the end of the spooling operation the state is set to Waiting to Despool 530. When the job is selected for despooling the job state is set to Despooling 540, and the PDF conversion utility is invoked. The output from the utility is written to the multiplexer. When the despooling operation is complete, the job state is set to Done 550.

In addition to the processing described above, a job (or group of jobs) may be cancelled, and spooled jobs may be held, released, or reordered.

FIG. 8 illustrates a table 800 summarizing state changes for each of the processes. The table illustrates the change from a first state 810 to a second state 812 for each process 814. The table also illustrates routine that performs the state changes 820.

Referring now to FIGS. 2-7, the interactions of various system components with the Job Monitor 200 during system initialization will be described. The Job Monitor 200 component is initialized prior to the initialization of the multiplexer 224, Pull Printing 236, or Spooler 228. Consequently, the monitor functions are available when these components are initialized. During system initialization each of these components is called to perform initialization tasks unique to the component. At initialization time, components that maintain persistent storage for jobs must inform the Job Monitor about all jobs held in their respective persistent storage locations.

Components that require notification (callback) 250 in order to release the persistent storage for a job that completes normally, or is cancelled, must register a callback routine with the Job Monitor 200. This is called the Job Complete callback 250. The Job Complete callback 250 is passed two parameters when it is invoked: the JobID and the reason for the invocation. The reasons may include: normal end of job (printed), job cancelled, and job spooling complete. The following Job Complete callback routines are defined:

| | |
|---|---|
| MUX | executed for job cancellation |
| Pull Print | executed for normal end of job, job cancellation, job spooling complete |
| Spooler | executed for normal end of job and job cancellation |

The call-backs for the Pull Print 236 and Spooler 228 components are only registered if the LAN and Spooler components, respectively, are installed in the printer. The multiplexer callback 250 is always registered (because the multiplexer component 224 is always present). Registration for the callback is done at system initialization time. During system operation, the call-back routines must be executed in the proper order. The order is determined at design time and built into the implementation. The order must be: multiplexer 224, Pull Print 236, Spooler 228. The call-back registration is accomplished by passing the address of the call-back routine, and a priority. The Job Monitor 200 executes the call-back routines according to the priority. The multiplexer 224 registers with priority 1, Pull Print 236 with priority 3, and the Spooler 228 with priority 5.

When a job is "completed" by the Job Monitor 200 for any of the "job complete" reasons (normal end of job, job canceled, job spooling completed), the Job Complete callback routines are invoked. It is the responsibility of each callback routine to determine what action, if any, must be taken by the component under the conditions that the call-back is invoked. For example, job cancelled 252 causes each of the components 220 to delete the job. On the other hand, no action is taken by the spooler 228 for notification of spooling completed. In any case, no action is taken if the component has no record of the job.

At multiplexer initialization time, the multiplexer 224 calls the Job Monitor 200 to register a Job Complete callback routine 250. This routine only acts upon jobs being processed through a PCM when a job is cancelled (call-back reason is job cancelled).

At initialization time, the Pull Print component 236 calls the Job Monitor 200 to register a Job Complete callback routine. This routine removes a job from the Pull Print Queue for the call-back reasons of normal end of job, job cancelled, and job spooling completed.

When the Pull Print component 236 is initialized it processes each job in the Pull Print Queue. The Pull Print Queue is kept in persistent storage. A series of calls to the Job Monitor 200 are executed for each job in the queue. The calls inform the Job Monitor 200 about each job in the queue and the attributes associated with the job that are kept in persistent storage. The attributes include the JobID and the URL of the job. The multiplexer Job State 400 of each job that is added to the Job Monitor table by the Pull Print component 236 during initialization is set to Pending Pull Print 412. The multiplexer Job State 200 is set by the Pull Print component 236.

At spooler initialization time, the spooler 228 calls the Job Monitor 200 to register a Job Complete callback routine. This routine deletes a job from the spool queue 228 for the call-back reasons of normal end of job and job cancelled.

At initialization the spooler processes each Job Description File in the JDF directory (the Spool Queue) 228. For each spool file found in the JDF directory the spooler 228 executes a series of calls to the Job Monitor 200. The calls inform the Job Monitor 200 about each job in the spool queue 228 and the attributes associated with the job that are kept in the JDF. The Spooler Job State 500 of all jobs added to the Job Monitor 200 table by the spooler 228 during initialization is Not Spooled The Spooler Job State 500 is set by the Spooler component 228.

Incoming jobs are received and handled by a PCM. The PCM makers calls to the multiplexer 224 to process the job. In the typical case, the multiplexer 224 requests a JobID for the new job through a call to the Job Monitor 200 when the first block of data arrives. This call generates a JobID, creates a row 310 in the job table 300, and initializes the attributes in the job table to default values. Subsequent calls to the Job Monitor 200 are executed to update the job attributes associated with the multiplexer 224 that are kept in the job table (PCM ID, PCM priority, personality, output request attribute, file format, multiplexer printing status and multiplexer spooling status). After setting the job attributes, the multiplexer 224 sets the multiplexer Job State 400 of the job to Pending Any 418. The multiplexer component (OS thread) 224 then determines the immediate output processing for the job. The following identify the possible responses from the multiplexer OS thread and the salient actions taken for each:

| | |
|---|---|
| Job assigned to the printer | multiplexer OS thread calls the Job Monitor to set the multiplexer Job State to Receiving Data, the output assignment to Printer, and the multiplexer printer output status to In Progress, and performs other processing necessary to pass print job data to the printer. |
| Job assigned to the spooler | multiplexer OS thread calls the Job Monitor to set the multiplexer Job State to Queued To Spool, the output assignment to Spooler, and the multiplexer spooling output status to In Progress, and performs other processing necessary to pass print job data to the spooler. |
| Job must wait for available resources | multiplexer OS thread calls the Job Monitor to set the job state to one of the pending states, and the output assignment to Wait. The specific pending state is determined by the multiplexer OS thread based upon the characteristics of the PCM and job attributes. |
| Job cannot be processed (e.g. PDF and no spooler) | the multiplexer OS thread calls the Job Monitor to set the job state to CANCELLED, and the output assignment to Rejected, and performs other processing necessary to cancel the job. |

A JobID 222 may also be requested from the Job Monitor 200 prior to the processing of the job by the multiplexer 224. (This occurs in the case of pull printing. The Pull Print PCM requests a JobID 222 at the time that the pull print request (URL) is accepted by the PCM well in advance of the receipt of any print data.) If a JobID 322 is assigned for a job prior to its normal processing by the multiplexer 224, then the PCM must inform the multiplexer 224 of the JobID 322 after the apsPDINewJob call and before the first apsPDIData call. (This is accomplished by a call to the multiplexer routine multiplexerSetJobID). In this case, when the apsPDIData routine is called, the multiplexer skips the logic to request a JobID described above (the other steps are executed as usual).

When a new Pull Print request is processed, a call is made by the Pull Print component 236 (executing on an HTTP thread) to the Job Monitor 200 to obtain a new JobID 322. After the JobID 322 is created, calls are made by the Pull Print component 236 to the Job Monitor 200 to update the URL attribute with the URL to be processed, and update the state to Pending Pull Print 412.

When a new job arrives, the OS thread is called to determine an output path for the job. If the spooler 225 is available, then the OS thread directs jobs to the spool by using either the Automatic or Spool All Possible algorithm.

Various components in the system recognize the end-of-job condition at different times. The following paragraphs describe the processing at the time that the PDL interpreter completes. It is at this time that the multiplexer 224 recognizes the end-of-job condition and proceeds with the processing of the next job.

When the PDL interpreter for a job completes, the multiplexer OS thread is eventually informed of this condition through a message. This is defined as the multiplexer end of job time. The OS thread maintains the JobID for the job currently assigned to the printer in an internal variable. (This identifies the JobID which may have data in the forward ring buffer, as described later under Job Cancel). At multiplexer end of job time the Job Monitor 200 is called to set the multiplexer printer output status for the job to Completed. The OS thread then sets its value of the active printing job to NULL. This insures that no action is taken to purge the forward ring buffer by the multiplexer Job Complete callback routine 250, if it gets called. The Job Monitor 200 is called to set the multiplexer Job State to Done 450.

When the OS thread completes its end-of-job processing for the ending job, it calls the GetNextPrintJob routine of the Job Monitor 200 to request the ID of the next job to be printed. The Job Monitor 200 examines jobs in the Pending Printer 414 and Pending Any 418 states and selects the next job to be printed. The selected job has the highest PCM priority and the lowest job number. The JobID is returned to the caller. A call is then made by the OS thread to the Job Monitor 200 to determine the PCM associated with the new job. The OS thread then calls the associated PCM Status routine indicating Start-flow. This causes the PCM to re-execute the apsPDI-Data call which results in a request for an output path. The OS thread receives the output selection request message from the PCM, allocates the printer, and remembers the associated JobID that is now writing data to the forward ring buffer. The OS thread calls the Job Monitor 200 to set the multiplexer job state to Receiving Data 410.

A value of NOJOB is returned by the GetNextPrintJob routine if there are no jobs waiting to be printed. In this case there is no more work to be done by the OS thread; it issues a wait on its message queue.

When the Job Monitor 200 recognizes the end of job condition, the job is marked as complete in the job table and references to the job in persistent storage are deleted. The Job Monitor 200 is informed by a message from the engine for each page that is delivered to an output tray. The message includes the JobID associated with the job. By comparing the JobID for an exiting page with the JobID for the previously exited page, the Job Monitor 200 detects when a job completes. When a job completes, the Job Monitor 200 calls all of the registered Job Complete call-back routines 250, passing the JobID for the completing job, and an indication of Normal end of job.

When the last page of the job is delivered to an output tray, a message is sent by the Engine component 236 to the Job Monitor 200. This is same type of message is sent whenever a page is delivered to an output tray. This message includes the JobID. The Job Monitor 200 detects that this is the end of a job and calls the registered Job Complete routines to remove the job from the system. The only processing that the multiplexer performs in its Job Complete routine is for job cancellation 252. The multiplexer Job Complete routine executes an immediate return when it is called with a Normal end-of-job indication.

The other Job Complete call-back routines 250 are called in their registered priority sequence by the Job Monitor 200. If the ending job was a pull print job, then the Job Complete callback routine 250 for pull printing finds a matching JobID in persistent storage and deletes it. Similarly, if the ending job was a spooled job, then the Job Complete callback routine 250 for the spooler 228 finds a matching JobID on the disk and deletes the associated files.

After all of the Job Complete callback routines 250 have executed, the Job Monitor 200 marks the job as JobDone in the job table. If there is no job history provided in the job table, the setting of a job to the JobDone state deletes it from the job table.

When the end of job is reached for a job that is directed to the spooler 228, the multiplexer OS thread is informed of this condition through a message from the multiplexer apsPDI-ENDOfJob routine. The message includes the ID of the job that has completed spooling. The OS thread calls the Job Monitor 200 to set the multiplexer Job State of the completing job to Pending Printer 414.

The Pull Print call-back routine removes the job from the pull print queue. This prevents the double printing of the job (once from the URL and once from the spool) in the event of a power failure prior to the completion of printing the job from the spool queue. The Job Complete call-back routines 250 for the other components perform no action when the reason for the callback is Q_SPOOL.

When the OS thread completes its end-of-job processing for the spooled job, it calls the GetNextJob routine of the Job Monitor 200 to request the ID of the next job to be spooled. The Job Monitor 200 examines jobs in the Pending Spooler 416 and Pending Any 418 states and selects the next job to be spooled. The selected job has the highest PCM priority and the lowest job number. The JobID is returned to the caller. A call is then made by the OS thread to the Job Monitor 200 to determine the PCM associated with the new job. The OS thread then calls the associated PCM Status routine indicating Start-flow. This causes the PCM to re-execute the apsPDI-Data call that results in a request for an output path. The OS thread receives the output selection request message from the PCM and allocates the spooler 228 through its normal processing. The OS thread calls the Job Monitor 200 to set the multiplexer Job State of the job to Queued To Spool 430; and the output assignment to Spooler 228.

A value of NOJOB is returned by the GetNextJob routine if there are no jobs waiting to be spooled. In this case there is no more work to be done by the OS thread, it issues a wait on its message queue.

When the Pull Print PCM completes the processing of al job through the multiplexer 224 to the printer 226, no action is taken to delete the associated queue entry (URL) from persistent storage. Sometime later, when the end-of-job condition is recognized by the Job Monitor 200, the registered Job Complete routines are invoked. For the normal end of job condition, the Pull Print Job Complete routine deletes the pull print entry for the associated JobID from persistent storage. However, the entry in persistent storage is deleted if the pull print job was directed to the spool.

When the Pull Print PCM completes the handling of a job, it calls the Job Monitor 200 to request the ID of the next job to be pulled. The Job Monitor 200 examines jobs in the multiplexer Job State of Pending Pull Print 412 and selects the next job to be processed. The selected job has the lowest job number. The JobID is returned to the caller. (The multiplexer Job State is not updated at this time. It is updated later, by the OS thread, as a result of the PCM call to the apsPDIData routine.) After obtaining the JobID) of the next job, a call is made, by the PCM to the Job Monitor 200 to determine the URL attribute of the new job. The PCM processes the pull print request using the returned URL.

A value of NOJOB is returned by the Job Monitor 200 if there are no jobs waiting to be pulled. In this case there is no more work to be done by the Pull Print PCM; it issues a wait on its message queue.

When the Despool PCM completes the processing of a job through the multiplexer 224, no action is taken by the multiplexer to change the multiplexer Job State, or by the Despool PCM to delete the associated spool files. Sometime later, when the end-of-job condition is recognized by the Job Monitor 200, the registered Job Complete routines are invoked. The Spooler Job Complete routine deletes the JDF and print file for the associated JobID.

At the completion of a job, the Despool PCM calls the GetNextJob routine of the Job Monitor to request the ID of the next job to be processed. The Job Monitor 200 examines jobs in the Spooling Can Despool 412 and Waiting to Despool 530 states and selects the next job to be processed. The job that is selected by the Job Monitor 200 depends upon the setting of the Despool Method (Shortest Job Next or Priority FIFO). The Despool method may be decided using a cookie in the configuration manager. The JobID of the selected job is returned to the caller. The Despool PCM sets the Spooler process job state 500 of the returned job to Despooling 540 and then processes the job. When the PCM output is assigned to the printer by the multiplexer OS thread, the OS thread calls the Job Monitor 200 to set the multiplexer job state to Receiving 420.

A Value of NOJOB is returned by the GetNextJob routine if there are no jobs available for despooling. In this case there is no more work to be done by the Despool PCM; it issues a wait on its message queue.

In the preferred embodiment, two interfaces are provided for cancelling jobs. However, those skilled in the art will recognize that the present invention is not meant to be limited to two interfaces. The two interfaces include: Cancel current job and Cancel specific JobID The Job Monitor 200 is informed of the request to cancel a job through a message 252. The message can be originated from any component 220. The typical sources are the console 234 and Web Pages 222. For the Cancel current job message 252, the Job Monitor 200 determines the JobID of the job that is to be cancelled through examination of internal variables and interaction with the Engine component 226. After the JobID is determined the Job Monitor 200 calls each of the registered Job Complete callback routines, passing the JobID for the job to be cancelled (deleted), and an indication that the reason for the call is job cancellation. After all of the callback routines have executed, the Job Monitor 200 sets the state of the job to CANCELLED.

When the multiplexer Job Complete routine is invoked for job cancellation, it checks each of the registered PCMs for a match on the specified JobID. If a match is found, then the Cancel bit is set in the device table. This causes all subsequent calls to the apsPDIData routine to discard the data. If the job is being spooled, then the sp_close routine is also called from the Job Complete routine to close the file and release the file descriptor. If the PCM supports the extended interface, then the PCM status routine is called, indicating Cancel. For PCMs which obtain or generate print data on their own (Pull Print, Despool, and Internal Print), this causes the PCM to terminate the data fetching or generation process. The Despool PCM status callback routine executes a close to the spool file that is being read from the disk. This is required in order for the later call to the spool Job Compete routine to successfully delete the spool file.

The ring buffer is checked after the PCMs are processed. If the JobID for the job being cancelled matches the OS thread remembrance of the actively printing job, then the forward ring buffer is flushed and the PMDD end-of-file routine is called.

When the data for a job is being processed by a PCM and sent through the multiplexer 224 to the printer 226, then the JobID in the PCM device table and the JobID for the actively printing job as remembered by the OS thread is the same. In this case the PCM is signaled to cancel the job, and the forward ring buffer is flushed. However, if the end of the job has cleared the PCM (the PCM has called the apsEndOfJob routine), but the forward ring buffer still contains data for the job, then the JobID of the job being cancelled matches the JobID for the forward ring buffer, but it does not match the JobID in the device table. In this case the PCM is not signaled to cancel the job. However the forward ring buffer must still be purged, and the PMDD eof routine is called.

According to PCM processing, the JobID in the device table is cleared when the End Of Job routine is called. After a PCM calls the apsEndOfJob routine it is possible for the PCM to begin processing its next job.

The multiplexer Job State 400 is not updated at the time that the multiplexer 224 processes a cancel request. The state is set to Done 450 when the apsPDIENDOfJob routine is called. This is the normal state progression for a job that is being sent to the printer 226. This is an exception to the normal progression for a spooled job.

A complicated case occurs when a Pull Print job is directed to the spooler 228, e.g., because the printer 226 was busy, and the job is selected for despooling while it is being received. In this case, a matching JobID is found in both the Pull Print PCM, and the Despool PCM. The multiplexer Job Complete routine processes both PCMs before returning.

The Spooler Job Complete routine deletes the JDF and print file for the associated JobID. If the job is being spooled or despooled at the time that it is cancelled, then the multiplexer Job Complete routine handles the job cancellation for the associated PCMs, which includes a call to the sp_close routine to release the file handle, before the Spooler Job Complete routine is called. This sequence is imposed by the order in which the callback routines register during system startup.

The Pull Print Job Complete routine deletes the pull print entry for the associated JobID from persistent storage. If the job is being processed by the Pull Print PCM at the time that it is cancelled, then the multiplexer Job Complete routine handles the job cancellation for the PCM before the Pull Print Job Complete routine, is called.

Web Pages 222 may request the status of all jobs by calling the JM_ListAllJobs routine. The address of a call-back function is passed as a parameter to the JobStatus routine. The Job Monitor 200 calls the call-back function for each job. The JobID is passed to the call-back routine as a parameter. Jobs are reported by the Job Monitor 200 in the order in which they are printed. The call-back routine calls JM_GetHandleFromId to obtain a handle for the job. It then makes calls to the Job Monitor 200 to obtain attributes to be displayed. The handle is released by calling JM_DestroyObject.

If there are no jobs to be displayed, then the call-back function is not called. The call to the JM_ListAllJobs function return after all of the call-backs have executed. The return code from JM_ListAll Jobs indicates whether or not the call-back was executed.

Job Monitor 200 functions are provided for components to fetch one or more jobs in an order relevant to the calling component. Based on the requested ordering, the Job Monitor 200 examines the various process job states and other variables to determine the correct response, and returns the appropriate JobID. The calling component may then obtain a handle, for the JobID and make calls to the Job Monitor to obtain needed attributes about the returned JobID. The following orderings are supported by the Job Monitor 200:

| | |
|---|---|
| JOB_TYPE_PRINT | This value is used by the multiplexer component to obtain the next job to be printed when the end-of-job condition is recognized by the multiplexer for a job that is being printed. The lowest numbered JobID for the highest priority PCM which is in the multiplexer Pending Printer or Pending Any states is returned. |
| JOB_TYPE_SPOOL | This value is used by the multiplexer component to obtain the next job to be spooled when the end-of-job condition is recognized by the multiplexer for a job that is being spooled. The lowest numbered JobID for the highest priority PCM which is in the multiplexer Pending Spooler or Pending Any states is returned. |
| JOB_TYPE_WEB_PULL | This value is used by the Pull Print component to obtain the next job Pull Print job to be processed. The lowest number JobID in the multiplexer Pending Pull Print state is returned. |
| JOB_TYPE_DESPOOL | This value is used by the Despooler PCM to obtain the next job to be despooled. The current value of the Despool Algorithm cookie is used to determine the response. The Despool Algorithms are: Priority-FIFO and Shortest Job Next. For PFIFO, the lowest numbered JobID for the highest priority source PCM which is in the Spooling Can Despool or Waiting to Despool state is selected. For SJN, the job with the fewest number of bytes that is in the Waiting to Despool state is selected. If no jobs are in the Wasting to Despool state, then a job in the Spooling Can Despool state is selected. |

The Job Monitor 200 task is spawned by system services at system startup and runs forever. This Job Monitor 200 waits on its task message queue and responds to the following messages:

When the Page Delivered To Output Tray message is received, the Job Monitor increments the page count for the associated job. The JobID for the page is checked with the JobID for the previous page. If the JobID has changed, then the job for the previous page is now complete. The Job Monitor calls the Job Complete routines and then marks the job as JOBDONE. In release 1, the job is removed from the Job Table at this point (there is no job history in release 1).

Cancel Current Job—When the Cancel Current Job message is received, the Job Monitor determines the JobID for the Current job and then calls the registered Job Complete routines. After the Job Complete routines have been called the job is marked as CANCELLED. In release 1, the job is removed from the Job Table at this point (there is no job history in release 1).

The following description explains the significant points associated with job processing in different scenarios. The first example involves a scenario where a job arrives, and is printed immediately. In this example, the printer 226 is idle when a new job arrives. When the first block of data for a new job is available, the PCM calls the apsPDIData routine. The multiplexer 224 recognizes this as the first call to apsPDIData. A call is made to JMCreateNewJob to create a new entry in the job table 300 and JMGetJobAttrib to obtain the JobID. A message is then sent to the multiplexer OS Thread in order to obtain an output path for the job. The OS Thread determines that the printer 226 is idle. OS Thread calls the JM_SetAttrInt32 routine to set the multiplexer Job State to Receiving. OS Thread then sends a response message to the PCM indicating that printer was assigned to the job. Upon receiving the response message, the apsPDIData routine writes the data to the ring buffer.

Another example involves Pull Print Job Spooling, Despooling, and Cancellation. In this example, the printer 226 is busy when a new Pull Print job arrives. The job is assigned to the spooler 228. The spooler 228 is idle and picks up the new job immediately. The spooler 228 is initially stopped due to the busy printer 226. A few moments later the printer 226 becomes free. The path to the printer 263 is allocated to the spooler 228 and the job begins printing. A few moments later the operator cancels the job 252 from the op panel 234. The sequence of events for this example is described below.

A user directs a browser to the printer 226 and navigates to the Job Submission page. The user enters the URL of a file in the entry area and clicks on the Submit button. The Web Pages 222 routine gets control and parses the web page input. A call is made to the Pull Print component 236. The Pull Print component 236 calls JM_CreateJobObject to create an entry in the job table and obtain a handle for the entry. JM_GetAttrint32 is called to obtain the JobID. Persistent storage is updated for the new job. JM_SetAttrString is called to set the URL attribute for the job in the job table. JM_SetAttrInt32 is called to set the multiplexer Job State to Pending Pull Print 412. A message is sent to the Pull Print PCM indicating that a new job has arrived. The idle PCM is awoken by the message. It calls the JM_GetNextJob routine to obtain the JobID) of the next Pull Print job to be processed.

Those skilled in the art will recognize that other examples in line with the teachings of the present invention are possible.

FIG. 9 illustrates a table 900 listing the attributes of a job according to the present invention. The table 900 demonstrates an attributes of a job 910 along with a type identification 912, a read only/read-write indication 914 and a description of its functions and how the attributes are set 920.

An event registration is used to provide a methodology for the controller to indicate events to the Job Monitor 200. The Job Monitor 200 serves as the system focal point for tracking job related events as they occur during the course of the entire print process. The event registration also provides a registration and communication path from the system instrumentation hooks to the various controller functions.

Events may be defined for the Job Monitor 200. For example, system events such as multiplexer events 224, pipeline events 232, print engine events 226, spool events 228, pull print events 236 and job monitor events 208 may be defined. Those skilled in the art will recognize that the present invention is not meant to be limited to these events. Rather, these events are provided as an example of system events that may be defined for the Job Monitor 200. For example, multiplexer events 224 may include Mux Begin Job (the Mux has begun processing a new job) and Mux End Job (the Mux has processed an End Job request). The PIPELINE events 232 may includes Page Submitted (a print page was submitted to the Pipeline from the PDL), Collate Failure (the multiple copy job has failed due to insufficient storage, wherein the Job Monitor 200 generates a 'Print Job End' event after the first (only) copy of the job has been delivered) and Release Page Memory (the PDL can now release the memory allocated for this page's resources). The PRINT ENGINE events 226 may include Page Processed (the specified page has been processed by the print engine subsystem 226, wherein processing states are defined as Committed, Stacked and Aborted. Spool events 224 may include Spool Job End (a job has completed spooling to the hard disk). PULL PRINT events 236 may include Pull Print Job End (a Pull print job has completed, wherein the entire job resides within the printer memory or hard disk, i.e., the job retrieval process is complete) The JOB MONITOR events include Print Job End (a job has completed at the system level, wherein all pages of all copy sets have completed printing and are stacked in the printer output bin, wherein the Job Monitor 200 generates this event based on pages submitted to the pipeline 232, pages delivered by the engine and the job copy count) and Cancel Job (a cancel job request has been initiated in the system, wherein the components registering for the cancel event should perform any necessary actions to delete specified job ID).

In summary, the present invention addresses the complexity of job processing by viewing the job on a higher conceptual plane. Instead of managing a collection of attributes and status variables that is unique for each data channel, or each PDL, a Job Monitor, is created, which contains and manages a repository of attributes and status associated with each print job that passes through the system. The advantage of this implementation is that it simplifies and centralizes the attribute and status elements associated with all jobs that are processed by the printer. Furthermore, the Job Monitor provides a common method of accessing variables associated with a job to all processing components within the printer.

The foregoing description of the exemplary embodiment of the invention has been presented for the purposes of illustration and description. It is not intended to be exhaustive or to limit the invention to the precise form disclosed. Many modifications and variations are possible in light of the above teaching it is intended that the scope of the invention be limited not with this detailed description, but rather by the claims appended hereto.

What is claimed is:

1. A method for providing printer recognition and management of a print job entity, comprising:
   establishing in a printer a repository of attributes and status information associated with each print job that passes through the printer;
   providing a plurality of printer components for processing the plurality of print jobs and for setting values of attributes in the repository for the plurality of print jobs; and
   establishing a job monitor, coupled to the repository and the plurality of printer components, for receiving the plurality of print jobs and determining whether to first spool or send the plurality of print jobs to a print engine upon receipt, for monitoring a status of the plurality of printer components, for managing the plurality of print jobs and the repository of attributes and status information associated with each of the plurality of print jobs, for managing the printer components in order to control the processing of the plurality of print jobs and for providing print job state information to a client associated with a print job associated with the print job state information based on attributes and status information maintained in the repository.

2. An apparatus for providing printer recognition and management of a print job entity, comprising:
   a printer for printing a plurality of print jobs, the printer further comprising:
   a repository of attributes and status information associated with the plurality of print jobs that pass through the printer;
   a plurality of printer components for processing the plurality of print jobs and for setting values of attributes in the repository for the plurality of print jobs; and
   a job monitor, coupled to the repository and the plurality of printer components, for receiving the plurality of print jobs and determining whether to first spool or send the plurality of print jobs to a print engine upon receipt, for monitoring a status of the plurality of printer components, for managing the plurality of print jobs and the repository of attributes and status information associated with each of the plurality of print jobs, for, for managing the printer components in order to control the processing of the plurality of print jobs and for providing print job state information to a client associated with a print job associated with the print job state information based on attributes and status information maintained in the repository.

3. The apparatus of claim 2, wherein the processes the plurality of print jobs according to requirements of the plurality of printer components and reports job attributes and processing status of the plurality of print jobs for common access by the plurality of printer components.

4. The apparatus of claim 2, wherein the the job monitor provides the plurality of printer components access to common variables, the components plurality of printer components presenting the job attributes or status information to the job monitor.

5. The apparatus of claim 2, wherein the repository is provided by a job monitor, the job monitor further providing logical views to obtain a next job to be processed by the plurality of printer components and to obtain a list of all jobs in the order that they are processed.

6. The apparatus of claim 2, wherein the job monitor is used to update attributes of print jobs.

7. The apparatus of claim 6, wherein the job monitor determines a next job to process, the plurality of printer components determining valid states for a call.

8. The apparatus of claim 7, wherein the job monitor includes a multiplexor, and wherein the valid states for the multiplexer further comprise:
   an unknown state for when a job identification is requested; and
   a pull print queue state for the job when the job is stop-flowed at a port connection manager waiting for access to the printer because a print engine is processing another job;
   wherein the multiplexer receives the job and selects to place the job in a must be spooled state, a may spool state or must print state.

9. The apparatus of claim 8, wherein the multiplexer routes the incoming job to a print engine or a spooler according to which becomes available first when the job is a job that may spool.

10. The apparatus of claim 2 further comprising a spooler.

11. The apparatus of claim 10, wherein the spooler receiving a job identification request, enters a not spooled state when the spooler has not yet processed the job, enters a spooling, can despool state when the job is being written to the spooler thereby allowing the job to be selected for despooling at any time, enters a spooling, despooling state when the job is being written to the spool device and is also being read from the spool device, enters a waiting to despool state when the end of the job has been received, enters a despooling state when the job is being read from the spool device and written to a multiplexer and enters the done state when the job is finished being processed by the spooler.

12. The apparatus of claim 2 further comprising an interpreter.

13. The apparatus of claim 12, wherein the interpreter enters a waiting for data state when job processing by the interpreter has started, enters an interpreting state when the job is being processed by the interpreter and enters a done state when the job is finished being processed by the interpreter.

14. The apparatus of claim 2, wherein the repository is provided by the job monitor, the job monitor further handling incoming jobs with a port connection manager, wherein the port connection manager calls to a multiplexer to process the job.

15. The apparatus of claim 2, wherein the repository is provided by the job monitor, the job monitor further deciding whether to assign a job to the printer, whether to assign a job to a spooler, whether the job must wait for available resources or whether the job cannot be processed.

16. The apparatus of claim 2 wherein the job monitor fetches jobs in an order that is dependent upon the calling component.

17. The apparatus of claim 16 wherein the job monitor examines process job states and variables to determine the correct response and to return an appropriate job identification for the plurality of print jobs.

18. The apparatus of claim 2 wherein the job monitor provides a common method of accessing variables associated with the plurality of print jobs for the plurality of printer components.

19. An article of manufacture comprising a program storage medium readable by a computer, the medium tangibly embodying one or more programs of instructions executable by the computer to perform a method for providing printer recognition and management of a print job entity, the method comprising:
    establishing in a printer a repository of attributes and status information associated with each print job that passes through the printer;
    providing a plurality of printer components for processing the plurality of print jobs and for setting values of attributes in the repository for the plurality of print jobs; and
    establishing a job monitor, coupled to the repository and the plurality of printer components, for receiving the plurality of print jobs and determining whether to first spool or send the plurality of print jobs to a print engine upon receipt, for monitoring a status of the plurality of printer components, for managing the plurality of print jobs and the repository of attributes and status information associated with each of the plurality of print jobs, for managing the printer components in order to control the processing of the plurality of print jobs and for providing print job state information to a client associated with a print job associated with the print job state information based on attributes and status information maintained in the repository.

* * * * *